(12) United States Patent
Tyree et al.

(10) Patent No.: US 9,189,560 B2
(45) Date of Patent: Nov. 17, 2015

(54) DISCOVERY OF ASSET INFORMATION THROUGH SCANNING OF COMMUNICATION TAGS ASSOCIATED WITH ASSETS

(75) Inventors: David Spencer Tyree, Denver, CO (US); Nathan Giardina, San Diego, CA (US)

(73) Assignee: CA, Inc., New York, NY (US)

( * ) Notice: Subject to any disclaimer, the term of this patent is extended or adjusted under 35 U.S.C. 154(b) by 253 days.

(21) Appl. No.: 13/371,958

(22) Filed: Feb. 13, 2012

(65) Prior Publication Data
US 2013/0212117 A1 Aug. 15, 2013

(51) Int. Cl.
G06F 17/30 (2006.01)

(52) U.S. Cl.
CPC .............................. G06F 17/30876 (2013.01)

(58) Field of Classification Search
None
See application file for complete search history.

(56) References Cited

U.S. PATENT DOCUMENTS

| | | | |
|---|---|---|---|
| 6,738,628 B1 * | 5/2004 | McCall et al. | 455/456.1 |
| 7,624,928 B2 | 12/2009 | Kimura et al. | |
| 2002/0111884 A1 * | 8/2002 | Groat et al. | 705/28 |
| 2003/0227392 A1 * | 12/2003 | Ebert et al. | 340/825.49 |
| 2003/0234288 A1 * | 12/2003 | Canipe et al. | 235/383 |
| 2004/0024644 A1 * | 2/2004 | Gui et al. | 705/22 |
| 2005/0087602 A1 | 4/2005 | Scannell | |
| 2005/0209947 A1 * | 9/2005 | Shafer | 705/36 |
| 2005/0253704 A1 * | 11/2005 | Neuwirth | 340/539.13 |
| 2005/0258241 A1 * | 11/2005 | McNutt et al. | 235/385 |
| 2006/0291473 A1 | 12/2006 | Chase et al. | |
| 2007/0150423 A1 * | 6/2007 | Kirschner et al. | 705/408 |
| 2009/0045915 A1 * | 2/2009 | Kennedy | 340/5.92 |
| 2010/0141435 A1 | 6/2010 | Breed | |
| 2010/0265061 A1 * | 10/2010 | Harmon et al. | 340/539.13 |
| 2011/0282715 A1 | 11/2011 | Nguyen et al. | |
| 2011/0313870 A1 * | 12/2011 | Eicher et al. | 705/16 |
| 2012/0110065 A1 * | 5/2012 | Oshima et al. | 709/203 |

FOREIGN PATENT DOCUMENTS

WO    WO 2010068980 A1 *  6/2010

* cited by examiner

*Primary Examiner* — Alex Gofman
*Assistant Examiner* — Umar Mian
(74) *Attorney, Agent, or Firm* — Baker Botts L.L.P.

(57) ABSTRACT

In some embodiments, a mobile device includes an interface configured to scan information from a communication tag associated with an asset, a memory operable to store the information, and a processor communicatively coupled to the memory. The information comprises a header describing the information, business application data, and asset identification data uniquely identifying the asset. The processor is configured to extract the business application data from the information scanned from the communication tag and extract the asset identification data from the information scanned from the communication tag.

18 Claims, 3 Drawing Sheets

DISCOVERY OF ASSET INFORMATION THROUGH SCANNING OF COMMUNICATION TAGS ASSOCIATED WITH ASSETS

TECHNICAL FIELD

The present disclosure relates to asset management and more specifically to discovery of asset information through scanning of communication tags associated with assets.

BACKGROUND

Asset management may refer to systems whereby items of value to an entity or group are monitored and/or maintained. Asset management may apply to both tangible and intangible concepts. Asset management may include a systematic process of operating, maintaining, and upgrading assets cost-effectively. Asset management may also include the practice of managing assets so that the greatest return is achieved.

SUMMARY

In some embodiments, a mobile device includes an interface configured to scan information from a communication tag associated with an asset, a memory operable to store the information, and a processor communicatively coupled to the memory. The information comprises a header describing the information, business application data, and asset identification data uniquely identifying the asset. The processor is configured to extract the business application data from the information scanned from the communication tag and extract the asset identification data from the information scanned from the communication tag.

Certain embodiments may provide one or more technical advantages. A technical advantage of one embodiment may include the capability to track assets within an enterprise using existing procedures for receiving and processing data for business applications. A technical advantage of one embodiment may include the capability to provide a communication tag storing both asset data uniquely identifying an asset and business application data serving a business purpose unrelated to the asset. A technical advantage of one embodiment may include the capability to generate and process communication tags while gathering information about the assets that generated those communication tags.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

Figure 1:
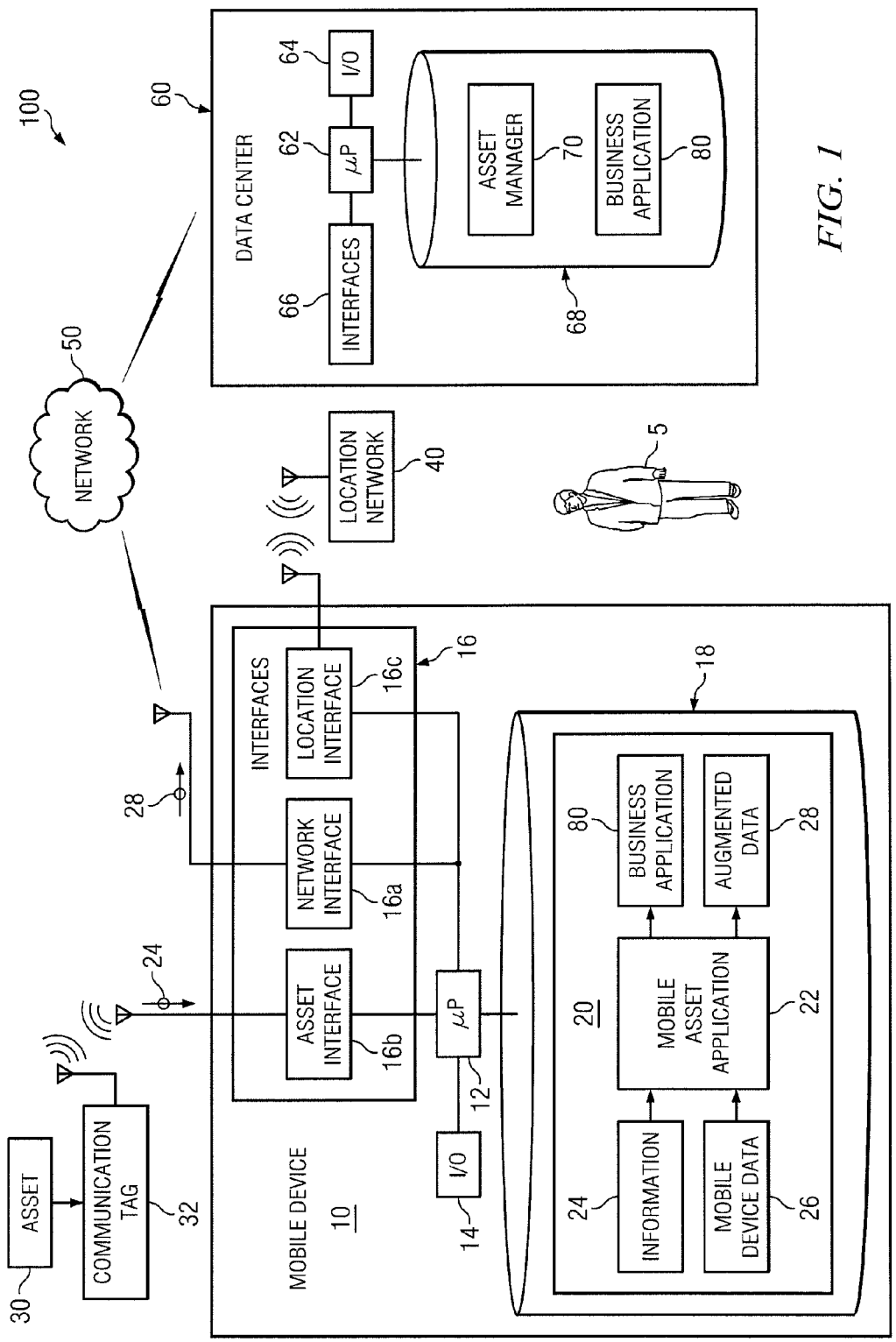
FIG. 1 shows an asset management system according to one embodiment.

Business applications may receive, process, and/or transmit business data for a variety of different purposes. In one example, an information technology (IT) service desk may use a business application to manage service tickets. In this example, the business application may track service ticket identifiers associated with service tickets. Each service ticket identifier may identify a certain service ticket, and a database may store information associated with each service ticket identifier (e.g., a completion status for each service ticket identifier). Upon receiving a service ticket identifier, the business application may retrieve and/or update information associated with the service ticket (e.g., update the database to indicate that the service ticket is complete).

In this example, a user may be required to input the service ticket identifier into the business application. In some scenarios, the user may input the service ticket identifier manually using a keyboard. In other scenarios, other communication mechanisms may be used to increase the speed at which business data is input into the business application. For example, a barcode may be printed on the service ticket. A barcode is an optical machine-readable representation of data. The barcode may store the service ticket identifier, and the service ticket identifier input into the business application by presenting the service ticket to a bar code reader that scans the barcode.

Printing bar codes on service tickets, however, requires a printer. For a large company, many printers may be deployed throughout the company. Managing these printers creates a new set of logistical problems. For example, the company may wish to know how many printers are in service, how often the printers are used, where the printers are located, or who is using the printers. For a large company, however, obtaining this information may be cost-prohibitive because the information is not easily obtainable. For example, if a printer is moved, personnel may be required to search for and locate the new location of the printer and then update that location in a database. In another example, personnel may be required to visually inspect and record page counts on each printer, which can be quite time-consuming for large companies.

To summarize, business applications may receive business application data (e.g., service ticket identifiers) generated using business assets (e.g., printers), but tracking and managing these business assets may be costly. Teachings of certain embodiments provide the capability to track and manage the business assets using the procedures for receiving business application data. Returning to the previous example, teachings of certain embodiments provide the capability to track and manage printers through the scanning of service ticket identifiers. By utilizing a business procedure already in place (scanning of service ticket identifiers), the company may track assets (e.g., printers) without requiring additional steps to be taken by personnel.

In some example embodiments, asset data is included in the business data to be scanned. Returning to the previous example, the barcode may theoretically include the service ticket identifier as well as information uniquely identifying the asset that generated the barcode (e.g., a serial number of the printer), other information regarding the asset (e.g., printer model), and information regarding printing of the barcode (e.g., time of printing, identification of user who printed barcode).

A standard one-dimensional barcode, however, has a limited storage capacity and may not be able to include all this information. Accordingly, teachings of certain embodiments provide the capability of using higher-volume representations of data, such as two-dimensional Quick Response (QR) codes, to store both business application data and asset data. Thus, QRCodes may be printed by company personnel for one purpose (e.g., printing service tickets), but the QRCodes may also be used for an entirely different purpose (e.g., tracking and managing printers).

In these examples, the business application data may not have any association with the asset that generated the QRCode. Returning to the previous example, a service ticket printed on a printer may not have any relation to the printer itself, and the service ticket identifier may not identify the printer in any way. The asset data included in the QRCode, however, may uniquely identify the printer and provide additional information about the printer.

Some information may be learned about the printer through the act of scanning the QRCode. For example, the printer may not know its own location, and thus this information may not necessarily be included in the QRCode. A device used for scanning, however, may know its location, and the location of the device for scanning may be used to approximate the location of the printer. For example, the device for scanning may be a mobile device equipped with a global positioning system (GPS) location tracker. In this example, the mobile device may insert the location identified by the GPS location tracker into the asset data received from the QRCode. In other words, the mobile device may augment the asset data with information associated with the mobile device.

FIG. 1 shows an asset management system 100 according to one embodiment. The asset management system 100 of FIG. 1 features a mobile device 10, an asset 30, a communication tag 32, a location network 40, a data network 50, and a data center 60. In operation, a user 5 may interact with mobile device 10 to scan information from communication tag 32 and transmit information to data center 60. Although the example of FIG. 1 shows one mobile device 10, one asset 30, one location network 40, one data network 50, and one data center 60, embodiments of system 100 may include more or fewer mobile devices 10, assets 30, location networks 40, data networks 50, and/or data centers 60.

Users 5 may include any individual, group of individuals, and/or entity that interacts with mobile device 10. Examples of users 5 include, but are not limited to, an employee, manager, executive, accountant, engineer, technician, contractor, agent, and/or customer. Users 5 may be associated with a business or other organization.

Mobile device 10 may include processors 12, input/output devices 14, communications links 16, and memory 18. In other embodiments, mobile device 10 may include more, less, or other components. Mobile device 10 may be operable to perform one or more operations of various embodiments. Examples of a mobile device may include, but are not limited to, mobile telephones (e.g., feature phones and smart phones), personal digital assistants (PDA), and mobile computers (e.g., tablet and netbook).

Processors 12 represent one or more tangible hardware devices operable to execute logic contained within a medium. In particular embodiments, processor 12 includes hardware for executing instructions, such as those making up a computer program. As an example and not by way of limitation, to execute instructions, processor 12 may retrieve (or fetch) the instructions from an internal register, an internal cache, or memory 18; decode and execute them; and then write one or more results to an internal register, an internal cache, or memory 18. In particular embodiments, processor 12 may include one or more internal caches for data, instructions, or addresses. This disclosure contemplates processor 12 including any suitable number of any suitable internal caches, where appropriate. As an example and not by way of limitation, processor 12 may include one or more instruction caches, one or more data caches, and one or more translation lookaside buffers (TLBs). Instructions in the instruction caches may be copies of instructions in memory 18, and the instruction caches may speed up retrieval of those instructions by processor 12. Data in the data caches may be copies of data in memory 18 for instructions executing at processor 12 to operate on; the results of previous instructions executed at processor 12 for access by subsequent instructions executing at processor 12 or for writing to memory 18; or other suitable data. The data caches may speed up read or write operations by processor 12. The TLBs may speed up virtual-address translation for processor 12. In particular embodiments, processor 12 may include one or more internal registers for data, instructions, or addresses. This disclosure contemplates processor 12 including any suitable number of any suitable internal registers, where appropriate. Where appropriate, processor 12 may include one or more arithmetic logic units (ALUs); be a multi-core processor; or include one or more processors 12. Although this disclosure describes and illustrates a particular processor, this disclosure contemplates any suitable processor.

Input/output devices 14 may include any device or interface operable to enable communication between mobile device 10 and external components, including communication with a user or another system. Example input/output devices 14 may include, but are not limited to, a display, keyboard, touch screen, camera, and microphone. Input/output devices 14 may be external to or internal to mobile device 10. For example, input/output devices 14 may include both a built-in keyboard, a plug-in keyboard, and a wireless keyboard.

Interfaces 16 are operable to facilitate communication between mobile device 10 and another element of a network. Interfaces 16 may connect to any number and combination of wireline and/or wireless networks suitable for data transmission, including transmission of communications. Interfaces 16 may, for example, communicate audio and/or video signals, messages, internet protocol packets, frame relay frames, asynchronous transfer mode cells, and/or other suitable data between network addresses. Interfaces 16 connect to a computer network or a variety of other communicative platforms including, but not limited to, a wireless network, a cellular network, a public switched telephone network (PSTN); a public or private data network; one or more intranets; a local area network (LAN); a metropolitan area network (MAN); a wide area network (WAN); a local, regional, or global communication network; an optical network; a satellite network; a cellular network; an enterprise intranet; all or a portion of the Internet; other suitable interfaces; or any combination of the preceding.

In the example of FIG. 1, mobile device 10 includes three interfaces 16a, 16b, and 16c. Interface 16a is a network interface that connects to network 50, allowing mobile device 10 to send and receive information with data center 60. Interface 16b is an asset interface that communicates with communication tag 32, such as by scanning information from communication tag 32. In some example embodiments, mobile device 30 scans information from communication tag 32 through interface 16b using QRCode scanning or near-field communication. Interface 16c connects to location network 40. In one example embodiment, interface 16c is a global positioning system receiver that receives location signals from satellites within location network 40.

Memory 18 represents any suitable storage mechanism and may store any data for use by mobile device 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a memory disk or smart card), database and/or network storage (for example, a server), and/ or other computer-readable medium.

In some embodiments, memory 18 stores logic 20. Logic 20 facilitates operation of mobile device 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by mobile device 10. Example logic 20 may include any of the well-known mobile-device operating systems, such as Blackberry OS, Blackberry Tablet OS, Google Android, Windows Phone, webOS, Symbian OS, Apple iOS, and Samsung's Bada, as well as other operating systems such as OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

In the example of FIG. 1, logic 20 may include a mobile asset application 22. Mobile asset application 22 receives information 24 from communication tag 32 and mobile device data 26 from mobile device 10 and generates augmented data 28.

In some embodiments, information 24 includes a header, business application data, and asset data. The header describes information 24. For example, the header may describe the format and version of communication tag 32. In addition, the header may describe where the business application data and the asset data are located within information 24. The header may also describe when communication tag 32 was created.

The business application data includes information for use in a business application and may serve some business purpose (e.g., tracking service tickets). The business application data may not have any association with asset 30.

The asset data uniquely identifies asset 30. The asset data may also include other information regarding the asset (e.g., asset model) and information regarding generation of communication tag 32 (e.g., time of generation, identification of user who generated communication tag 32).

In some embodiments, the asset data is expressed in the form of a uniform resource locator (URL). By accessing the URL, the asset data contained within information 24 may be latently communicated to asset manager 70. In addition, URLs may provide a flexible and dynamic format for encoding asset information because URLs are interpreted on the server side when called. URLs may also provide a standardized means for mobile asset application 22 to augment the asset data with mobile device data 26. Mobile asset application 22 may augment the asset data by adding parameters from mobile device data 26 to the URL.

Mobile device data 26 is data associated with mobile device 10. Examples of mobile device data 26 may include, but are not limited to, identification of mobile device 10, identification of a user of mobile device 10, a location of mobile device 10, and the time at which mobile device 10 scans communication tag 32. In one example, mobile device data 26 includes location information retrieved from location network 40 through location interface 16c. Mobile asset application 22 may augment information 24 with mobile device data 26 to yield augmented data 28. For example, mobile asset application 22 may insert mobile device data 26 into the asset data to yield augmented data 28.

In the example of FIG. 1, logic 20 also includes a business application 80. Business application 80 may receive and/or process the business application data from information 24. For example, business application 80 may receive the business application data and update a database of information in light of the business application data. If, for example, the business application data is inventory information regarding a particular product, business application 80 may update an inventory tracking database in light of the business application data.

Asset 30 may include any item to be tracked and/or managed. In some embodiments, asset 30 generates communication tag 32. Examples of asset 30 may include, but are not limited to, electronics equipment such as a computer, monitor, printer, or networking device. For example, a computer may render a communication tag 32 on a monitor, which may be scanned by mobile device 10. In another example, a printer may print a communication tag 32 onto an object such as a piece of paper. In this examples, asset 30 may not be the originator of the content within communication tag 32. For example, a printer may print content generated from a computer, and that computer may receive the content from another computer.

Communication tag 32 communicates information 24 to mobile device 10. In one example embodiment, communication tag 32 is a two-dimensional barcode, such as a QRCode. A QRCode is a two-dimensional bar-code that can be scanned by any of a variety of devices capable of optical recognition, such as purpose built scanners, computers or smart phones connected to or comprising a camera. In situations in which the QRCode is being scanned by a smart phone, the contents of the QRCode may be interpreted by a mobile application running on the smart phone. In some scenarios, based on the content of the QRCode, the device scanning the QRCode can navigate to an URL embedded in the QRCode to access content including but not limited to media files. The QRCode may also directly download or present the media files without navigating to a URL. In some embodiments, the QRCodes may be used to initiate contact (e.g., email, phone, text, instant message, etc.) with a company representative or to load an application provided by the company.

In another example embodiment, communication tag 32 is a near-field communication (NFC) device. NFC is a wireless technology that is used to exchange data between devices in very close proximity (2" or less). Like QRCodes, NFC may be capable of transmitting both business application data and asset data.

Location network 40 may include any communication devices operable to provide location information to mobile device 10. One example of location network 40 may include satellites that provide global positioning information to mobile device 10. Another example of location network 40 may include a local positioning system with elements such as cellular base stations, Wi-Fi access points, trace networks (e.g., "fingerprinting), and radio broadcast towers. Interface 16c may use any suitable method for determining the location of mobile device 10 using signals received from location network 40, such as triangulation and trilateration.

Network 50 may represent any number and combination of wireline and/or wireless networks suitable for data transmission. Network 50 may, for example, communicate internet protocol packets, frame relay frames, asynchronous transfer mode cells, and/or other suitable data between network addresses. In the example of FIG. 1, Network 50 is a cellular data network. In some embodiments, however, Network 50 may include any public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable interfaces; or any combination of the preceding. Although the illustrated embodiment shows one network 50, certain embodiments recognize that more or fewer networks may be used and that not all elements may communicate via a network. Certain embodiments also recognize that communications over a network is one example of a mechanism for communicating between parties, and any suitable mechanism may be used.

Data center 60 receives business application data, asset data, and/or mobile device data from mobile device 10. In one example embodiment, data center 60 receives augmented data 28, which includes both asset data and mobile device data.

Data center 60 may include processors 62, input/output devices 64, communications links 66, and memory 68. In other embodiments, data center 60 may include more, less, or other components. Data center 60 may be operable to perform one or more operations of various embodiments. Although the embodiment shown provides one example of data center 60 that may be used with other embodiments, such other embodiments may utilize computers other than data center 60. Additionally, embodiments may also employ multiple data centers 60 or other computers networked together in one or more public and/or private computer networks, such as one or more networks 30. For example, in some embodiments, asset manager 70 and business application 70 may be associated with different data centers 60.

Processors 62 represent one or more tangible hardware devices operable to execute logic contained within a medium. In particular embodiments, processor 62 includes hardware for executing instructions, such as those making up a computer program. As an example and not by way of limitation, to execute instructions, processor 62 may retrieve (or fetch) the instructions from an internal register, an internal cache, or memory 68; decode and execute them; and then write one or more results to an internal register, an internal cache, or memory 68. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 68, and the instruction caches may speed up retrieval of those instructions by processor 62. Data in the data caches may be copies of data in memory 68 for instructions executing at processor 62 to operate on; the results of previous instructions executed at processor 62 for access by subsequent instructions executing at processor 62 or for writing to memory 68; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

Input/output devices 64 may include any device or interface operable to enable communication between data center 60 and external components, including communication with a user or another system. Example input/output devices 64 may include, but are not limited to, a mouse, keyboard, display, and printer.

Interfaces 66 are operable to facilitate communication between data center 60 and another element of a network, such as other data centers 60. Interfaces 66 may connect to any number and combination of wireline and/or wireless networks suitable for data transmission, including transmission of communications. Interfaces 66 may, for example, communicate audio and/or video signals, messages, internet protocol packets, frame relay frames, asynchronous transfer mode cells, and/or other suitable data between network addresses. Interfaces 66 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable interfaces; or any combination of the preceding.

Memory 68 represents any suitable storage mechanism and may store any data for use by data center 60. Memory 68 may comprise one or more tangible, computer-readable, and/or computer-executable storage medium. Examples of memory 68 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 68 stores asset manager 70. Asset manager 70 tracks and manages assets 30. Asset manager 70 may manage information gathered when mobile device 10 scans communication tag 32. For example, asset manager 70 may be able to identify an asset 30, the model and characteristics of asset 30, where asset 30 is located, when asset 30 was last used, who has been using asset 30, when asset 30 has generated communication tags 32, and when those communication tags 32 were scanned. Asset manager 70 may also provide additional information based on information gathered when mobile device 10 scans communication tag 32. For example, asset manager 70 may calculate the workload or life expectancy of asset 30 based on the totality of scans of communication tags 32. As another example, asset manager 70 may be able to track the movement of asset 30 throughout a company and identify where additional assets 30 may be useful.

Memory 68 may also stores business application 80. In some embodiments, business application 80 performs similar functions to the business application 80 of mobile device 10. In these embodiments, business application 80 may be located on mobile device 10, data center 60, or both locations. In some embodiments, business applications 80 on mobile device 10 and data center 60 work together. For example, business application 80 on mobile device 10 may process information into a form suitable to the business application 80 on data center 60.

In operation, according to one example embodiment, asset 30 is a printer that prints communication tag 32 on a service ticket. In this example embodiment, communication tag 32 stores information 24, which includes a header, business application data, and asset data. The header may identify information such as the date communication tag 32 was generated and the length of the business application data (e.g., 000A, or 10 characters). The business application data includes an identifier that identifies the service ticket. The asset data includes information uniquely identifying the printer.

In this example embodiment, asset interface 16b of mobile device 10 scans communication tag 32 for information 24. Mobile asset application 22 provides the business application data to business application 80, which runs locally on mobile device 10 and/or remotely on data center 60. Mobile asset application 22 also augments the asset data with mobile device data 26 to yield augmented data 28. For example, mobile asset application 22 may insert mobile device data 26 such as location information, time of scan information, and information identifying the mobile device 10 into the asset data to yield augmented data 28.

Figure 2:
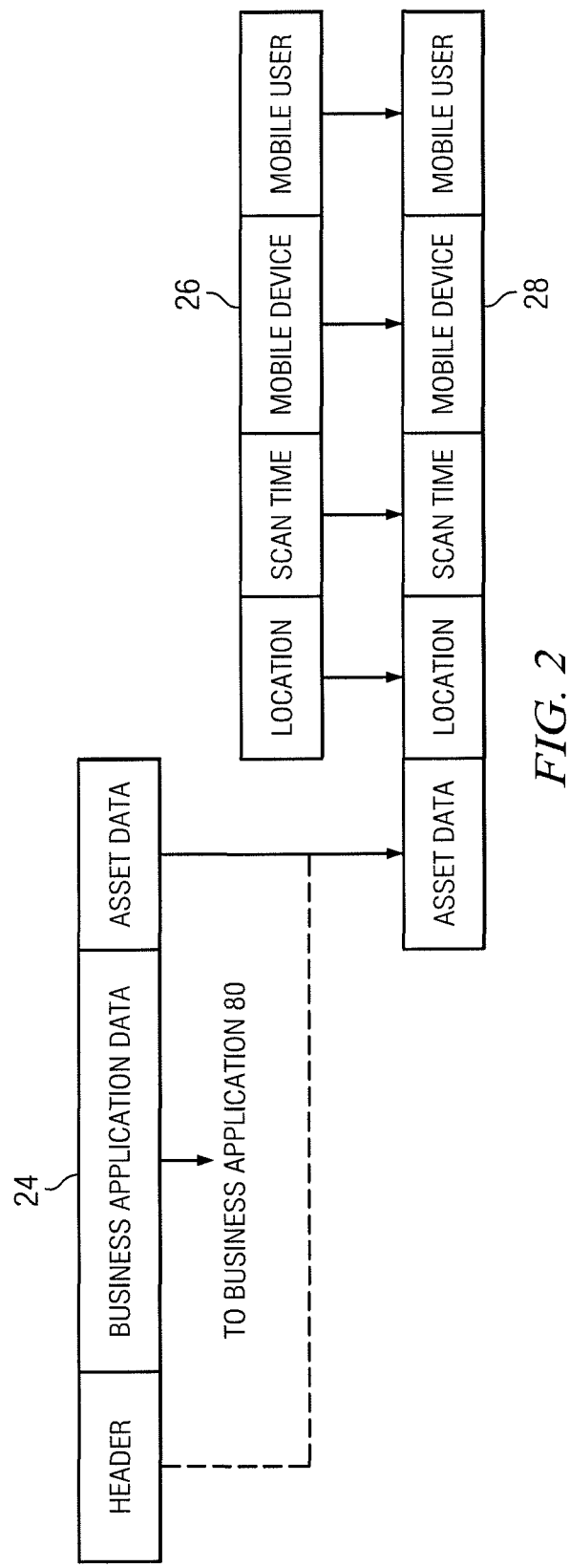
FIG. 2 shows the information, mobile device data, and augmented data of FIG. 1 according to one example embodiment.

FIG. 2 shows information 24, mobile device data 26, and augmented data 28 according to one example embodiment. In the example of FIG. 2, information 24 includes a header, business application data, and asset data. The header describes information 24. For example, the header may describe where the business application data and the asset data are located within information 24. The business application data includes information for use in a business application and may serve some business purpose (e.g., tracking service tickets). The business application data may not have any association with asset 30. The asset data uniquely identifies asset 30. The asset data may also include other information regarding the asset (e.g., asset model) and information regarding generation of communication tag 32 (e.g., time of generation, identification of user who generated communication tag 32). In some embodiments, some of this information may be included in the header rather than the asset data. For example, the time at which communication tag 32 is generated may be located in the header rather than the asset data.

Mobile device data 26 is data associated with mobile device 10. Examples of mobile device data 26 may include, but are not limited to, identification of mobile device 10, identification of a user of mobile device 10, a location of mobile device 10, and the time at which mobile device 10 scans communication tag 32. In one example, mobile device data 26 includes location information retrieved from location network 40 through location interface 16c.

In the example of FIG. 2, the business application data found in information 24 is transmitted to business application 80. The asset data, as well as some data from the header, are combined with the mobile device data 26 to yield augmented data 28. Some example scenarios are provided below to explain this process in greater detail.

In a first example scenario, asset 30 is a printer that prints a QRCode (communication tag 32) on a service ticket. In this example scenario, information 24 includes:
[HEADER]
    A—QRCode Format
    1—Version
    3BE2 (15330)—Days since EPOC 1970
    000A (10)—Length of application data
[APPLICATION DATA]
    SD:12210730
[ASSET DATA]
    http://xxx.yy/1?assetID=3828202—The asset information URL In this example, the fully encoded QR Packet would appear as so:
    A113BE2000ASD:12210730http://xxx.yy/1?assetID-3828202

When mobile asset application 22 provides the business application data to business application 80, which runs locally on mobile device 10 and/or remotely on data center 60. Mobile asset application 22 also augments the asset data with mobile device data 26 to yield augmented data 28. For example, mobile asset application 22 may insert mobile device data 26 such as location information, time of scan information, and information identifying the mobile device 10 into the asset data to yield augmented data 28. For example, mobile asset application 22 may augment the asset data with the mobile device data 26 to yield the following augmented data 28:
    http://xxx.yy/1?assetID=3828202& when=3BE2& latitude=38.234231& longitude=34.234232& altitude=510& userId=user-1@xxx.yy& scanTime=1307126406& deviceString=Android2.3

Once augmented data 28 is generated, the augmented URL may be accessed by mobile device 10 and/or data center 60. In some embodiments, accessing the augmented URL will report information about asset 30 to asset manager 70. For example, the endpoint for the URL may decode the URL and enter the asset information into asset manager 70. As a result of this process, asset manager 70 may learn information such as: (1) whether the printer is still being used, (2) approximate location for the printer, (3) traceability between printers and service tickets, and (4) information about who is using the printer.

In a second example scenario, asset 30 is a monitor that displays a QRCode (communication tag 32) on a computer screen for purposes of authenticating a user. For example, a user may log-in to an application through a website, and the user may scan the QRCode on the website as part of a process for logging-in. The asset information may be encoded in the QRCode either by the browser (using a client-side QRCode generation library) on the server side (which examines the incoming HTTP request). In this example scenario, information 24 includes:
[HEADER]
    A—QRCode Format
    1—Version
    3BD9 (15327)—Days since EPOC 1970
    004c (76)—Length of application data
[APPLICATION DATA]
    175619882ef8485799f163bc906eddd562c02bc48975cfc 1247 . . .
[ASSET DATA]
    http://xxx.yy/1?ip=17.29.42.137&os=0.1&osv=SP3

In this example, the fully encoded QR Packet would appear as so:
    A113BD9004c175619882ef8485799f163bc906eddd562 c02bc48975cfcf247 http://xxx.yy/1?ip=17.29.42.137&os=0.1&osv=SP3

In this scenario, mobile asset application 22 may augment the asset data with the mobile device data 26 to yield the following augmented data 28:
    http://xxx.yy/1?ip=17.29.42.137&os=0.1&osv=SP3& when=3BE2& latitude=38.234231& longitude=34.234232& altitude-510& userId=user-1@xxx.yy& scanTime=1307126406& deviceString=Android2.3

Once augmented data 28 is generated, the augmented URL may be accessed by mobile device 10 and/or data center 60. In some embodiments, accessing the augmented URL will report information about asset 30 to asset manager 70. For example, the endpoint for the URL may decode the URL and enter the asset information into asset manager 70. As a result of this process, asset manager 70 may learn information such as: (1) location of the asset, (2) the type of asset (e.g., for funding purposes), (3) when the asset was last used, and (4) operating system of the asset.

In a third example scenario, asset 30 is a printer, and a user is able to print on the printer by scanning a QRCode associated with the printer. In this example, the QRCode (communication tag 32) was not necessarily generated by the printer (asset 30). In some embodiments, the QRCode may be attached to the printer or otherwise be physically associated with the printer. In this example scenario, information 24 includes:

[HEADER]
    A—QRCode Format
    1—Version
    3BD9 (15327)—Days since EPOC 1970
    004c (76)—Length of application data
[APPLICATION DATA]
    printerIP=27.13.112.15 . . .
[ASSET DATA]
    http://xxx.yy/1?assetID=13A13D17

Once augmented data 28 is generated from the asset data and mobile device data 26, the augmented URL may be accessed by mobile device 10 and/or data center 60. In some embodiments, accessing the augmented URL will report information about asset 30 to asset manager 70. As a result of this process, asset manager 70 may learn information such as: (1) location of the printer, (2) who is using the printer, (3) when the printer was last used, (4) model and make of the printer, and (5) the scanning device make and model.

In a fourth example scenario, asset 30 is a physical location within a building, such as a door. A user may be required to scan a QRCode (communication tag 32) before entering the physical location. In this example, the business application may determine whether the user is authorized to access the physical location. In this example scenario, information 24 includes:

[HEADER]
    A—QRCode Format
    1—Version
    3BD9 (15327)—Days since EPOC 1970
    004c (76)—Length of application data
[APPLICATION DATA]
    DoorID=12;resourceID=12123 . . .
[ASSET DATA]
    http://xxx.yy/1?assetID=12123

In this example, the business application data also happens to identify asset 12123. Once augmented data 28 is generated from the asset data and mobile device data 26, the augmented URL may be accessed by mobile device 10 and/or data center 60. As a result of this process, asset manager 70 may learn information such as: (1) when the physical location was last accessed, (2) the mobile device scanning the QRCode, and (3) the person requesting access to the physical location.

In each of these four scenarios, communication tag 32 is a QRCode. Teachings of certain embodiments recognize, however, that other types of communication tags may be used. In some embodiments, for example, communication tag 32 is a NFC device. Like QRCodes, NFC may be capable of transmitting both business application data and asset data.

Although communication tags such as QRCodes and NFC devices have larger storage capacities than one-dimensional barcodes, the storage capacities of QRCodes and NFC devices are still limited. Thus, teachings of certain embodiments provide the capability to prioritize which information is included in communication tag 32.

The amount of available space for asset data depends on how much space is dedicated to business application data. If communication tag 32 is limited to 512 bytes of data, for example, asset data will be limited to the following bytes: 379 bytes if 133 bytes are dedicated to business application data; 34 bytes if 478 bytes are dedicated to business application data; and 0 bytes if 534 bytes are dedicated to business application data. In the last example, 0 bytes are available for asset data because the business application data has exceeded the 512 byte size constraint.

In addition to prioritizing between business application data and asset data, teachings of certain embodiments provide the capability to prioritize which fields are included in asset data. Asset data may include a variety of different fields, including, but not limited to: "assetId" (the asset identifier associated with a specific asset); "type" (type of asset, e.g., P=printer, D=desktop, L=laptop, M=mobile device); "IP" (the IP address associated with the asset, in 4 byte to 16 byte form); "mac" (the mac address associated with an asset, in 6 byte form); "os" (operating system, e.g., 0=Windows, 0.0=Windows XP, 0.1=Windows 2000, 0.2=Windows 2K3 Server, 0.3=Windows vista, 1=Unix, 1.0=Linux, 1.1=BSD, 2=MacOSX); and "osv" (operating system version).

In one example embodiment, assetId is included in the asset data if the size constraint has not been exceeded and the assetId is known. If there is still room within the size constraint after assetId is included in the asset data, the remaining fields may be included in the following order of priority: IP, type, mac, os, and osv.

Figure 3:
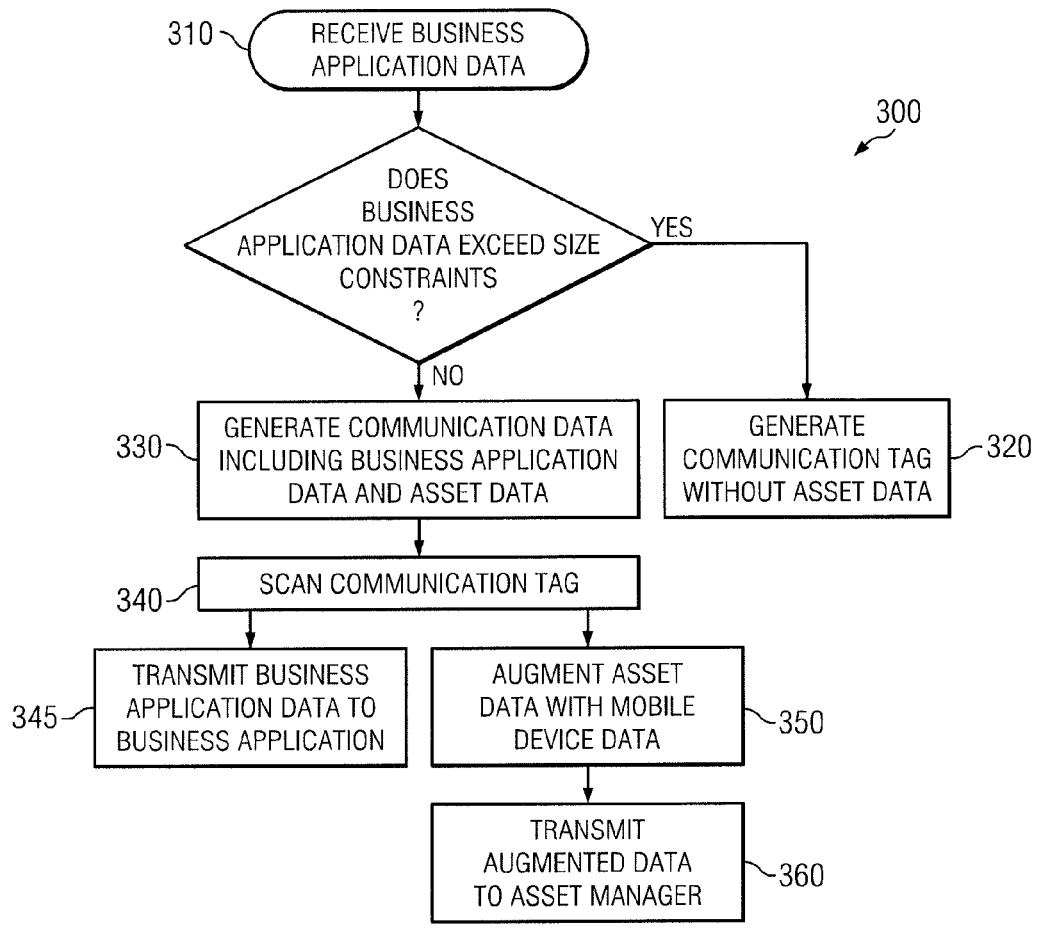
FIG. 3 shows a method for generating, scanning, and processing communication tags.

FIG. 3 shows a method 300 for generating, scanning, and processing communication tags. At step 310, business application data is received. If the business application data exceeds the size constraints associated with the communication tag, then the communication tag is generated without asset data at step 320. If the business application data does not exceed the size constraints associated with the communication tag, then the communication tag is generated with the asset data and the business application data at step 330.

At step 340, the communication tag is scanned by a mobile device. The business application data is extracted from the communication tag and transmitted to the business application at step 345. The asset data is extracted from the communication tag and augmented with mobile device data at step 350, and the resulting augmented data is transmitted to an asset manager at step 360. Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

What is claimed is:

1. A mobile device, comprising:
a Quick Response code (QRCode) scanner operable to scan information from a QRCode created by an asset, the information comprising:
  a header describing the information;
  a uniform resource locator (URL) containing asset identification data uniquely identifying the asset that created the QRCode; and
  business application data not associated with the asset;
a memory operable to store the information and mobile device data associated with the mobile device comprising data:
  identifying a location of the mobile device,
  identifying when the QRCode is scanned, and
  identifying a user associated with the mobile device;
a processor, communicatively coupled to the memory, the processor configured to:
  extract the business application data from the information scanned from the QRCode;
  provide the business application data to a business application;
  extract the URL from the information scanned from the QRCode;
  insert the mobile device data identifying the location of the mobile device, when the QRCode is scanned, and the user associated with the mobile device into the URL to yield an augmented URL; and
  access an endpoint for the augmented URL, the endpoint configured to:
    retrieve, from the augmented URL, the asset identification data uniquely identifying the asset that created the QRCode; and
    track placement of the asset that created the QRCode based on the location of the mobile device from the mobile device data in the augmented URL.

2. A device, comprising:
an interface configured to scan information from a communication tag created by an asset, the information comprising:
  business application data; and
  a uniform resource locator (URL) containing asset identification data uniquely identifying the asset that created the communication tag;
a memory operable to store the information and device data associated with the device, the device data comprising data identifying a location of the device; and
a processor, communicatively coupled to the memory, the processor configured to:
  extract the business application data from the information scanned from the communication tag;
  extract the asset identification data from the information scanned from the communication tag;
  insert the device data into the URL to yield an augmented URL; and
  access an endpoint for the augmented URL, the endpoint configured to:
    retrieve, from the augmented URL, the asset identification data uniquely identifying the asset that created the communication tag; and
    track placement of the asset that created the communication tag based on the location of the device from the device data in the augmented URL.

3. The device of claim 2, wherein:
the processor is configured to augment the asset identification data with the device data to yield augmented data.

4. The device of claim 3, wherein:
augmenting the asset identification data with the device data comprises inserting the data identifying the location of the device into the asset identification data to yield the augmented data.

5. The device of claim 3, wherein:
the device data comprises data identifying when the communication tag is scanned; and
augmenting the asset identification data with the device data comprises inserting the data identifying when the communication tag is scanned into the asset identification data to yield the augmented data.

6. The device of claim 3, wherein:
the device data comprises data uniquely identifying the device or a user associated with the device; and
augmenting the asset identification data with the device data comprises inserting the data identifying the device or a user associated with the device into the asset identification data to yield the augmented data.

7. The device of claim 2,
wherein the device data is inserted into a query string of the URL to yield the augmented URL, and wherein the endpoint is further configured to retrieve the device data from the query string of the augmented URL.

8. The device of claim 6, the processor being further configured to transmit the URL to an asset manager.

9. The device of claim 2, wherein:
the communication tag is a Quick Response code (QRCode); and
the interface is configured to scan the QRCode.

10. The device of claim 2, wherein the interface is configured to scan the communication tag using near-field communication.

11. A method for managing assets in a business environment, comprising:
scanning information from a communication tag created by an asset, the information comprising:
  business application data; and
  a uniform resource locator (URL) containing asset identification data uniquely identifying the asset that created the communication tag;
extracting the business application data from the information scanned from the communication tag;
providing the business application data to a business application;
extracting the asset identification data from the information scanned from the communication tag;
inserting mobile device data associated with a mobile device into the URL to yield an augmented URL, the mobile device data comprising data identifying a location of the mobile device; and
accessing an endpoint for the augmented URL, the endpoint configured to:
  retrieve the asset identification data uniquely identifying the asset that created the communication tag; and
  track placement of the asset that created the communication tag based on the location of the mobile device from the mobile device data in the augmented URL.

12. The method of claim 11, further comprising augmenting the asset identification data with the mobile device data to yield augmented data.

13. The method of claim 12, wherein:
augmenting the asset identification data with the mobile device data comprises inserting the data identifying the location of the mobile device into the asset identification data to yield the augmented data.

14. The method of claim 12, wherein:
the mobile device data comprises data identifying when the communication tag is scanned; and
augmenting the asset identification data with the mobile device data comprises inserting the data identifying when the communication tag is scanned into the asset identification data to yield the augmented data.

15. The method of claim 12, wherein:
the mobile device data comprises data uniquely identifying the mobile device or a user associated with the mobile device; and
augmenting the asset identification data with the mobile device data comprises inserting the data identifying the mobile device or a user associated with the mobile device into the asset identification data to yield the augmented data.

16. The method of claim 11,
wherein the mobile device data is inserted into a query string of the URL to yield the augmented URL, and wherein the endpoint is further configured to retrieve the mobile device data from the query string of the augmented URL.

17. The method of claim 12, further comprising transmitting the URL to an asset manager.

18. The method of claim 11, wherein:
the communication tag is a Quick Response code (QR-Code); and
the interface is configured to scan the QRCode.

* * * * *